United States Patent Office 3,096,779
Patented July 9, 1963

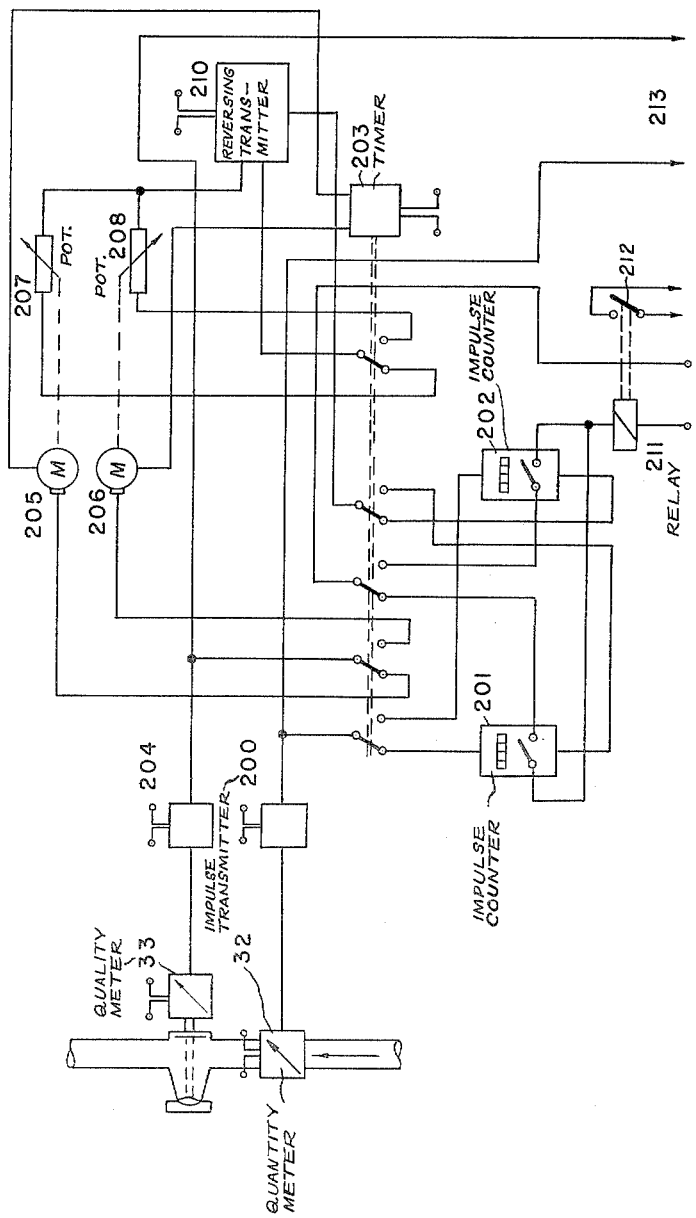

3,096,779
DUAL CHARACTERISTIC ADDITIVE FEEDING SYSTEM
Alfred Kraft, Schonberger Feld 3, Kronberg, Taunus, Germany, and Erhard Kämpf, Klingsorstrasse 109a, Finkenweg 2, Malmsheim, near Stuttgart Wurttemberg-Baden, Germany
Filed Nov. 24, 1959, Ser. No. 855,041
4 Claims. (Cl. 137—101.19)

This invention relates to a method and a system for dosing solid, liquid or gaseous materials into a continuously flowing liquid or gaseous material, the flow velocity and physical or chemical characteristics of the continuously flowing material being variable and the chemicals being added in quantities required for obtaining a desired chemical or physical-chemical effect.

The invention is applicable, for example, in connection with a waste water clarification plant which receives strongly varying quantities of water with highly varying degrees of contamination. In order to purify this water to a constant quality, the necessary chemicals must be added in quantities which correspond to the throughflow at any one time as well as to the qualitative characteristics of this quantity. Ordinarily there is no linear relationship between quality (e.g. turbidity, pH value, $m$-value, chlorine consumption, BOD value, temperature etc.) and required quantity of chemicals.

It is an object of this invention to provide an improved system and method for controlling the dosing of treating materials into a continuously flowing fluid to correspond to a plurality of varying characteristics of said fluid.

Another object is to provide a system and method for controlling the dosing of treating materials into a continuously flowing fluid varying in quantity and quality to obtain a desired treating result.

Another object is to provide means for integrating the momentary quantity and quality values of a fluid over a set period of time and to use the integrated value for controlling the time of operation of a dosing device of constant output.

Another object is to provide means for integrating the metered momentary values of at least one variable characteristic of a fluid over a first time interval, for modulating in the subsequent time interval of equal length the integrated value in accordance with momentary values of another characteristic metered during said first time interval, and for using the modulated value for controlling the time during which treating materials are dosed into the fluid in said subsequent time interval.

Other objects of the invention will become apparent upon consideration of the detailed description and of the claims, which follow.

Many attempts have been made to solve the problem of simultaneous quantitative and qualitative proportioning of chemical dosing without reaching a satisfactory solution.

Thus, from German Patent No. 626,668 an apparatus is known for the quantitative and qualitative proportional dosing of precipitants in raw water, which is to govern the addition of precipitants proportional to the quantity and turbidity of the liquid. The apparatus includes a liquid meter which is always connected upstream of the clarifier, and a turbidimeter, which is connected downstream of the clarifier when the turbidity changes slowly, but upstream of the clarifier when the turbidity values change quickly. Dosing of the precipitant is carried out in dependence on the turbidity and flow velocity in such manner that two valves are arranged in sequence in the precipitant inlet line leading to the clarifier. One of these valves is positioned proportionally to the changes in the flow velocity, while the other is controlled proportionally to variations in the turbidity value.

This arrangement can work satisfactorily only if the flow velocity and turbidity variations are limited to a narrow range of values. Furthermore it presupposes that the turbidity value and the quantity of chemicals required are proportional to each other. This condition is rare, as the usual flocculation processes for precipitation of turbidity ordinarily do not operate with stoichiometric quantities of chemicals.

With such a sequential installation of two valves controlled by two values which are independent of each other, it can happen, for example, that the valve controlled by the waste water quantity is throttled so far that there remains for the second valve only a throughflow lying outside its regulation range. It is also known that the throughflow characteristic of valves is linear only within narrow limits. If for example the first valve is controlled from the throughflow velocity of the raw water and the second from the turbidity value, then, in the case of a small throughflow of highly concentrated raw water, the first valve will be throttled so far that only a small quantity of precipitating reagent flows to the second valve which can hardly be regulated according to the turbidity value. Frequently, for example with sudden rainfalls, the degree of turbidity of the incoming waste water rises with the increase of the inflow quantity. Then the regulating range of the two sequentially connected valves is exceeded, because the second valve cannot pass more liquid than flows to its from the first valve.

Since such extreme cases are not rare, the dosing of individual or several reagents frequently is first controlled proportionally to quantity, and thereafter corrected quality values are measured in a second independent regulating circuit and converted to control values for a quality proportional dosing. Also this arrangement does not result in a reliable and exact control. An overdosing can occur already in the first stage which cannot be corrected in the following quality proportional dosing.

In another known method the quality and quantity values are measured as differential momentary values, are multiplied with one another and the resulting value is continuously transmitted to the controlled dosing apparatus. This control value is used, for example, for continuously regulating the number of revolutions of the drive motor. This control technique is theoretically rather exact, but requires complicated and expensive amplifiers and control units and for each drive motor a separate device for regulating the number of revolutions.

A method for quantity proportional dosing of reagents in continuous processes which has been described and claimed in our copending application, Serial No. 711,513, now Patent No. 2,939,469, comprises measuring and integrating the throughput quantity of the main component in the inlet line over a short time interval and converting it to a linear or angular value, and thereafter, during a following time interval of equal length, dosing from dosing devices with constant output over a period of time which is proportional to the linear or angular value obtained, with the integrating device being returned to the zero position, and being switched back into the quantity measuring position at the beginning of the next following time interval. With two such apparatus which are alternately used as quantity counters during forward movement and as time controllers for the dosing devices during the return movement, a continuous computation of individual quantities in consecutive time intervals takes place and to each individual quantity the proportional material quantity is added in the following time interval. With a qualitatively constant metered liquid, the dosage is proportional to the throughflow and follows it with a delay of one time interval. This delay is negligible with time intervals of one minute.

The present invention provides a method and system for dosing one or more reagents quantitatively and qualitatively proportional into continuous chemical processes, wherein a throughflow value and a quality value are converted to electrical measuring values which are summated in suitable manner, e.g. by addition, multiplication or the like to a control value, which is integrated over a predetermined time. The integrated value thus found is then used for controlling a dosing device with constant output. If there is no linear relationship between the quality value and the quantity of chemicals, the quality value must be corrected by an experimentally determined function, e.g. by a potentiometer with a characteristic brought in agreement with this function or a transmitter with a gear ratio according to this function. The electrical values of the quantities and of the qualities, the latter if necessary modified, are integrated before or after summation, i.e. individually or jointly, over a time interval of say one minute, and the integrated value is applied for control of the dosing devices in such manner that the dosing devices, which feed with constant velocity, are put in operation for a period of time proportional to the integrated value. For reagents which are always added in the same proportion, the several dosing devices, for example, pumps, screw feeders etc. can be controlled by a single timer.

With several quality values which are variable with respect to each other, e.g. in water treatment hardness, turbidity, BOD, chlorine consumption and the like, a separate control value for each component to be added must be formed which is composed of the value of the quantity of the throughflow which is equal for all components and the quality value which must be measured for each component individually.

The value of the quantity of throughflow can be measured by means of a throughflow quantity meter according to the differential pressure principle. The momentary values indicated are converted into electrical voltage values e.g. by means of a potentiometer connected with the shaft of the indicator instrument. The quantity value can also be formed by means of a water meter, whose number of revolutions are converted, for example according to the dynamo principle, to an electric potential proportional to the throughflow velocity.

The quality values are preferably converted to electrical intensity values (current strength). For example, the turbidity can be measured photoelectrically, whereby the strength of the photo current follows the turbidity indirectly proportionally. If necessary, this value may be amplified. On the other hand it is possible to convert the quantitative values to intensity values and the qualitative values to voltage values (pH value).

The intensity value and the voltage value are applied to a metering motor (watt meter) which forms the product and delivers it as number of revolutions. This number of revolutions is converted, for example by means of reduction gearing, to a linear or angular value which is proportional for equal time intervals to the product of the quantity value and of the quality value (corrected if necessary) which has been integrated in one time interval. At the expiration of one time interval the metering motor is disconnected from the metering devices and is connected under reversal of poles to a source of constant current. It returns then with constant velocity to its initial position. The time required therefor is proportional to the product of the quantity and quality values, i.e. it corresponds to the quantity of chemicals which must be added to the quantity of raw water measured during the preceding time interval, in order to obtain a desired effect. In accordance with this time the duration of operation of the dosing devices of constant output is controlled, so that they feed corresponding quantities of material.

By means of a timer two of these metering motors are alternately connected to the metering circuit and to the time control circuit, so that for each time interval a control value is determined and is converted in the following time interval to the length of operation of the dosing devices.

The summation of a quantitative value and a qualitative value, and of their electrical measuring values, respectively, can also take place in such manner that only the quantitative value is applied to the metering motor in the metering circuit and controls its forward movement, while the qualitative value is applied to a potentiometer in time control circuit and increases or decreases the return movement velocity of the metering motor. This can be effected by increasing or decreasing the resistance which determines the constant return velocity of the metering motor in the time control cycle, in accordance with the quality values, with a non-linear relationship between quality value and quantity of chemicals being taken into account, as described. By a suitable arrangement of the quality and quantity metering stations, a sufficient exact temporal coordination of the metering values can be obtained.

Quality changes in waste water ordinarily do not occur suddenly, but over periods of time which are long in comparison to the metering interval of say one minute, contemplated herein, and are within the range of about five minutes. Therefore it is often sufficient to ascertain a mean quality value in the time interval of the quantity metering or an adjacent interval and to utilize this in the described manner for modulating the return movement time of the metering motor and thereby also the time of operation of the dosing devices. This arrangement has the advantage that the quantity value and the quality value can be metered in the same electrical dimensions, e.g. as voltages or as intensities, whereby the product formation in a watt meter becomes superfluous.

In manufacturing plants which discharge several times per day waste waters from production charges, the conditions can be so reversed that the quantity value undergoes only slight variations, while the quality value temporarily changes strongly. In this case the same metering arrangement is used in such manner that the quality value is metered and integrated continuously, while the quantity value is used to modify the return movement time of the metering motor. In the two systems described at least one metering motor which is alternately connected to the metering circuit and to the time control circuit is provided for each component or—if for a reaction to be carried out several components must be added—for each group of components. In actual practice, however, it is advantageous to provide for each component or group of components a pair of metering motors, i.e. two metering motors which are alternately switched from one circuit to the other.

To make allowance for a larger number of quality values, a corresponding number of metering motors are switched in analogous manner, if necessary in groups, from the metering circuit to the time control circuit and vice versa. The multiple timers required therefor may cause a considerable mechanical and electrical complication. Therefore, according to the invention, a further system is provided wherein the combined electrical metering values of the quantity and quality values are additively stored as impulses according to the digital method, and the impulse sum accumulated during one time interval is used during the following time interval as measure for the time of operation of the dosing devices.

For example, the watt meter in which the multiplication of the momentary values of the quantity and quality values takes place, is provided with an impulse transmitter which transmits one impulse for several product units whose number can be chosen by means of the gear ratio. The number of impulses transmitted per time interval is then the integral control value which determines the length of time of operation of the dosing devices. With this arrangement, the watt meter with the impulse transmitter remains continuously connected to the metering circuit. An impulse counter receives the impulses transmitted during one time interval and is connected during the following time interval to the time control circuit. There it is returned to the zero position by a return mechanism moving with constant velocity, the time required therefor being the measure of the time of operation of the dosing devices.

In the meantime a second impulse counter in the metering circuit stores the impulses in the metering circuit, the sum of which becomes the measure for the duration of operation of the dosing devices in the following time interval. Both impulse counters are switched from one time interval to the next from the impulse transmitter to the return mechanism or vice versa.

In analogous manner impulse counters can be used also when operating with continuously integrating metering of the quantity value or the quality value in the metering circuit and with a return velocity of the metering motor in the time control circuit modulated by the mean value of the quality value or the quantity value, respectively. In this case only one of the two values is converted to impulses and counted, while the other value is used to modulate the velocity of revolution of the return mechanism.

In principle the intermittent dosing technique is not limited to the treatment of water; it presupposes, however, that the substances involved in the reaction are intimately mixed after their combination and that a sufficienly large reaction tank is available therefor. This condition is fulfilled in water treatment, as the chemical reactions, and particularly the sedimentation, require much more time than the metering period.

The invention will be more readily understood by reference to the drawings, wherein several systems for carrying out the invention are shown diagrammatically.

FIGURES 3 and 4 are systems utilizing digital metering apparatus.

Figure 1:
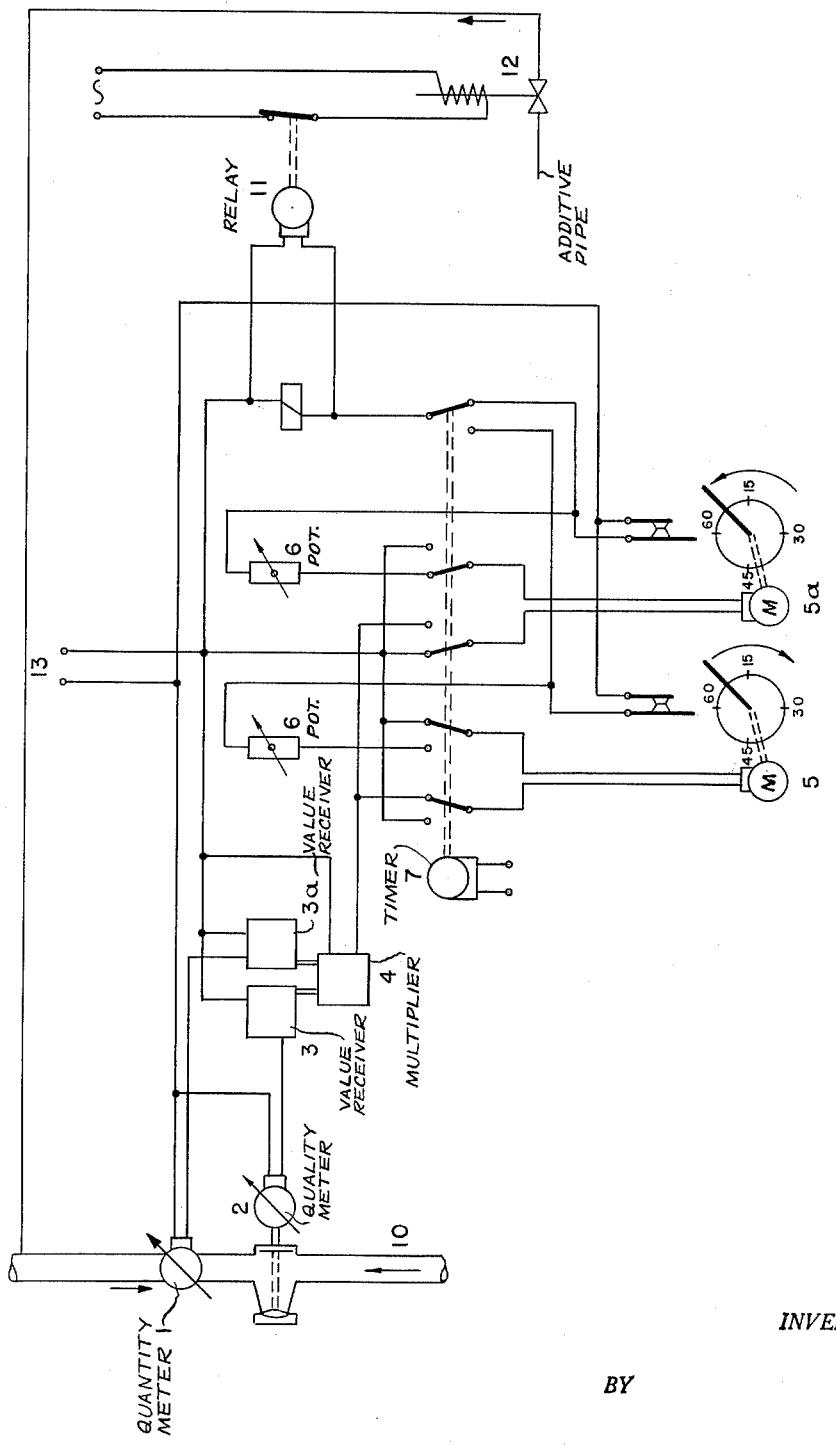
FIGURE 1 shows a system wherein the product formation from quality and quantity value takes place in the metering circuit.

The system according to FIGURE 1 includes in the inlet 10 to the reaction vessel, with water purification plants in the raw water inlet conduit, a quantity meter 1 with indicator and transmitter for the metered value, a quality meter 2 with indicator and transmitter for the metered value, for each of these instruments a metered value receiver, 3 and 3a, respectively, a multiplication device 4 for forming the product of the metered values, two metering motors 5 and 5a for integration of the product over the period of a metering interval, and a timer 7 for alternately connecting the metering motors to the metering circuit and the time control circuit, respectively. The potentiometers 6 serve for regulating the return velocity of the two metering motors. 11 is the switching relay for starting and stopping of the dosing device 12 for the material to be fed, which operates with constant adjustable output. The system is connected to a regulated source of power 13.

In the receivers 3 and 3a the impulses transmitted from the metering stations can be amplified in known manner. Furthermore transmitters can be incorporated in the receivers which convert the transmitted metering value into a further functional value. As will be seen from Example 1, it may occur that the addition of chemicals does not follow the controlling quality value in linear relation, i.e. that a high turbidity requires relatively smaller addition of flocculants than a low turbidity. This function which must be ascertained experimentally for each individual case, can be applied to the metering values in the receiver by means of a transmitter.

The receivers 3 and 3a transmit in continuous sequence momentary values of the throughflow quantity and the respective quality to a multiplying instrument, and the latter transmits the product of the momentary values to one of the two metering motors 5 or 5a, respectively. In the metering motor the momentary value products are integrated over a constant, adjustable time interval, for example one minute. After expiration of the time interval the timer 7 switches the metering motor from the metering circuit to the time control circuit. During this switch over the metering motor is connected, under reversal of poles, to the constant source of power 13 and returns now from the end position reached in the metering circuit with constant velocity to its initial position. As soon as it reaches this position, it disconnects the dosing device and itself. Therefore, the dosing device, which has a constant output, is operated for a period of time which is proportional to the sum of the momentary value products formed in the metering circuit during a time interval.

While the metering motor 5 controls the time of operation of the dosing device, the metering motor 5a is connected in the metering circuit and integrates the sum of the momentary products in order to apply them in the following time interval, after a switch over by the timer 7 to the time control cycle, to the dosing device in the manner described.

The potentiometers 6 serve to regulate the return velocity of metering motors 5, 5a so that they return from the maximal end value to the initial position within the time interval.

Figure 2:
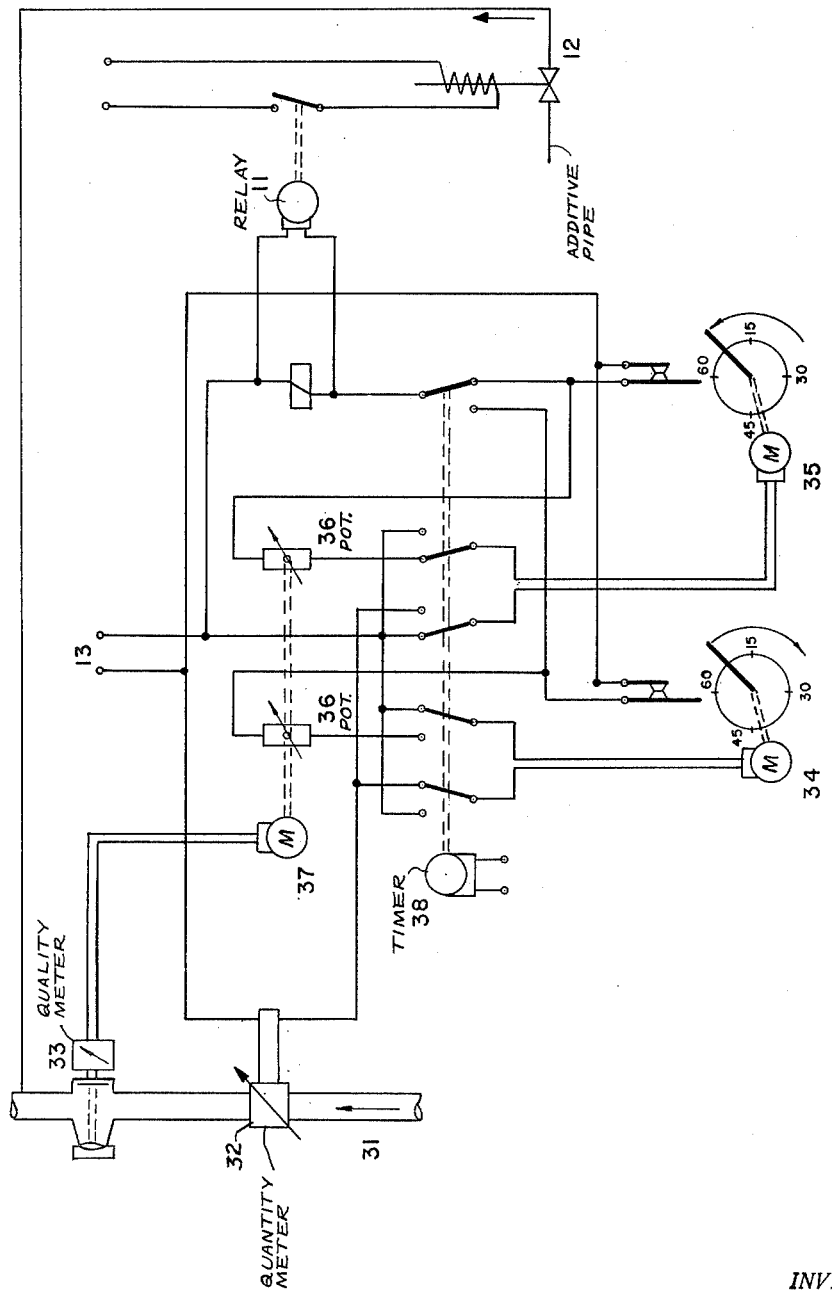
FIGURE 2 shows a system wherein one value is applied to the metering circuit, the other in the time control circuit.

In the system according to FIGURE 2, one of the two measuring values is applied to the metering motors 34, 35 in the metering circuit and the other in the time control circuit. The quantity meter 32 with an indicator and a metered value transmitter and the quality meter 33 with an indicator and a metered value transmitter are provided in the raw water inlet. The momentary values of the quantity meter are applied to the metering motor 34 and integrated by it over the predetermined time interval, for example one minute. The momentary values of the quality meter are applied through a regulating motor 37 and a regulating potentiometer 36 to the other metering motor 35 which, at that time, is in the time control circuit. The regulating potentiometer 36 follows the quality values proportionally or selects per time interval one or several mean values and decreases or increases the return velocity of the metering motor 35 in dependency of the changes in quality value. A timer 38 effects the necessary change over of the metering motors to forward and return movement at each start of a new time interval. The connections can also be made so that the quality value is applied to the metering motor in the metering circuit, while the quantity value is applied to a potentiometer 36 in the time control circuit. This kind of connection permits in some cases a simplification. For example, if the quantity value changes according to a known program, then the potentiometer can be positioned by hand or by means of a programmer, so that the transmission of the metering value from the quantity meter to the potentiometer becomes unnecessary or available for other purposes. Such a situation may occur when an industrial plant introduces into the general sewer at predetermined times for predetermined periods waste water quantities of like magnitude. The potentiometers of FIGURE 1 can be controlled according to a known program in analogous manner, so that a further variable, preferably the temperature, can be introduced. The three variables can be associated with the given metered value transmitters as desired. For example in the system of FIGURE 1, one can form in the multiplication device 4, which may be a wattmeter, the product of the quantity and quality values and apply the temperature value to the potentiometer 6; or the quality and temperature values can be combined in the wattmeter and the quantity value be applied to the potentiometer. Preferably the value which changes least or according to a known program is applied to potentiometers 6 or 36, respectively.

If only one of the values quantity, quality, temperature is variable, the metering and transmitting instruments for the constant values are eliminated. The potentiometers 6, 36 are fixed values adjustable by hand.

In FIGURE 2 each metering motor 34, 35 is provided with a regulating potentiometer 36. However, the connections can be made also with a single regulating potentiometer for both metering motors. If, as described in connection with FIGURE 1, the quality value shall be corrected by a function, this can be done by proper forming of the characteristic of the potentiometer or by interposing a transmitter. With regard to relays 11 and dosing apparatus 12 and regulated power source 13, the flow sheets of FIGURES 1 and 2 are the same.

Figure 3:
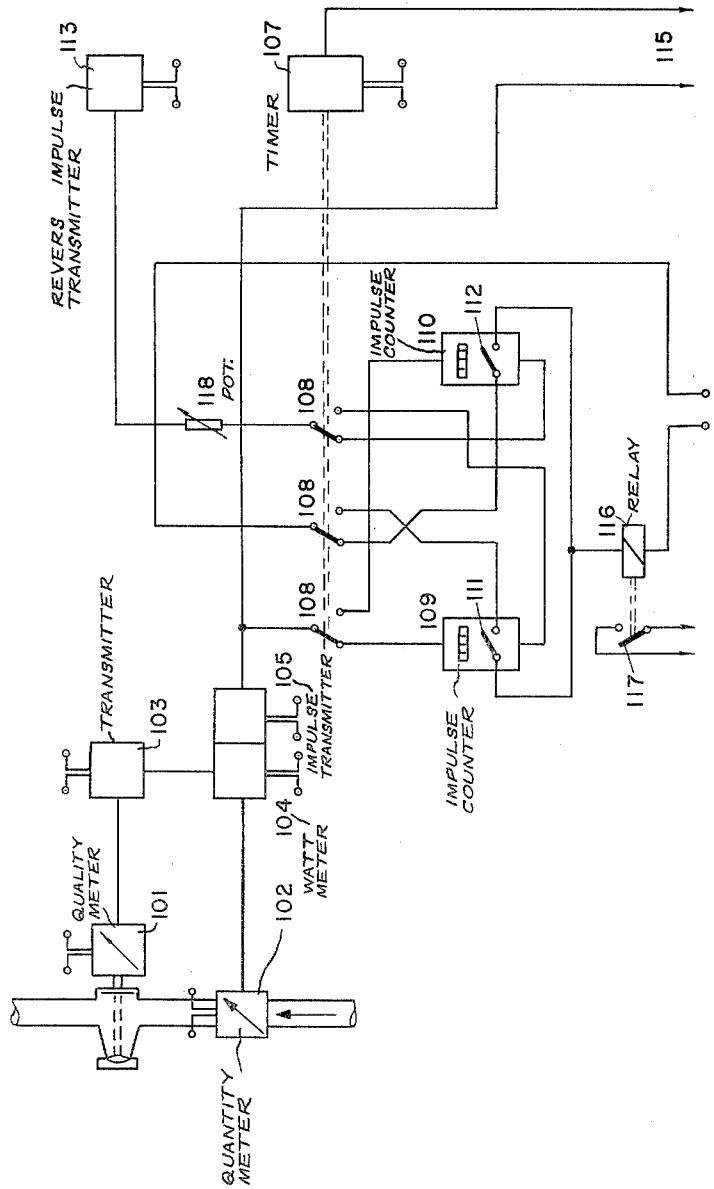

In the system of FIGURE 3, 102 is the meter for the quantity value, 101 the meter for the quality value, 103 a transmitter for correcting the quality value according to the function of the dependency of the quantity of material to be dosed from the quality value. 104 designates a watt meter which is coupled with the impulse transmitter 105. Such impulse transmitters for electrical work metering are known.

A timer 107 alternately transmits the impulses through switches 108 to the impulse counters 109 or 110. These two impulse counters are provided with a forwardly and backwardly positionable counter system and with a disconnecting contact 111, 112, respectively, which is open in the zero position of the counter.

While impulse counter 109 in the metering circuit counts and stores during one time interval the impulses from watt meter 104, the impulse counter 110, which has carried out this function during the preceding time interval, is returned to the zero position by a reverse impulse transmitter 113. Transmitter 113 transmits per time interval a uniform adjustable sequence of impulses. The impulse frequency of this instrument is adjusted so that the return of the impulse counter to the zero position within the set interval of timer 107 is assured even with the maximum number of impulses that can be expected from impulse transmitter 105. The length of time of the return determines the time of operation of the dosing devices, which are controlled by relays 116, 117. This time starts when the impulse counter is connected into the time control cycle and is terminated when the zero position is reached by opening of contact 111 or 112, respectively. At the end of the time interval the timer 107 connects the unloaded impulse counter into the measuring cycle and the loaded impulse counter into the time control cycle. The impulses accumulated by the impulse counters can be applied via lines 115 to a counting or recording instrument. These instruments record or summate the impulses run up during individual time intervals over a longer period of time, e.g. a day or a week, and provide thereby a statistical basis for operation and control of the plant.

The system according to FIGURE 4 utilizes the principle, described in connection with FIGURE 2, of applying the quantity value and the quality value in different time intervals, in combination with digital measuring methods.

In an impulse trasmitter 200 the sum of the momentary values of the quantity value is converted to a series of impulses which is applied alternately from time interval to time interval to the impulse counters 201 and 202. The alternating connection of the impulse counters into this measuring circuit is effected by a timer 203. The quality value is applied to the impulse counter in the following time interval in the time control cycle to increase or decrease the return velocity. To this end the measuring values coming from transmitter 204 are applied alternately to one of the servomotors 205, 206. These servomotors operate regulators 207 and 208, respectively, which change the impulse frequency of the reversing transmitter 210 and thereby influence the return velocity of the impulse counters. 211 and 212 are the switching relays which turn the dosing devices on and off.

The sequence of the metering and switching steps is as follows:

While the counter 201 stores impulses from transmitter 200, the servomotor 205 positions the regulator 207 in accordance with the quality value, whereby the impulse frequency of transmitter 210 and the return velocity of counter 202 (which is in the time control circuit during this time interval) is modified in accordance with the quality value. At the end of the first time interval the counter 202 is connected to the transmitter 200, while the counter 201 is connected by means of timer 203 into the time control circuit including the regulator 208 and is returned to the zero position by the reverse impulse transmitter 210. The duration of the return movement, which is modulated by the quality value through regulator 208, determines the time of operation of the dosing device. When the two counting devices are switched over at the end of the first time interval by means of timer 203, the timer returns the two servomotors to their initial position. In the following second time interval the counter 202 is in the measuring circuit, the counter 201 and the regulator 208 in the time control circuit. In the third time interval the connections are again as in the first time interval (FIGURE 4). The systems of FIGURES 3 and 4 can also be simplified if only one variable is to be evaluated, whereby the resistance 118 (FIGURE 3), or 207, 208 (FIGURE 4), respectively, become manually positionable fixed values. Via lines 213 the metering values or impulses respectively formed by the transmitters 200 and 204 can be applied to a counting or recording instrument.

Two examples of the application of the invention described above are given as follows:

*Example 1.*—For the clarification of a canal water with highly variable turbidity aluminum sulfate is used as flocculant. By tests the following quantities of chemicals are determined:

| Turbidity: | Aluminum sulfate/m.$^3$ (cubic meter) |
|---|---|
| 50 mg./l. (milligram per liter) | gram 30 |
| 100 mg./l | do 50 |
| 200 mg./l | do 100 |

The quantity of water to be treated varies between 250 and 500 m.$^3$/h. (cubic meter per hour). The water quantities are metered continuously by means of a differential pressure measuring instrument. To the measuring instrument a potentiometer is connected which transmits a voltage proportional to the water quantity.

A photoelectric turbidimeter determines the turbidity value which is available as electrical current value which may e.g. be indicated. With the indicating instrument a correcting transmitter is connected which corrects the metered value according to the functional relation quantity of chemicals/m.$^3$ as function of the metered turbidity.

Both metered values, "quantity" and "turbidity" (corrected) are then multiplied by a wattmeter and integrated in the manner described in connection with FIGURE 1. The values can be amplified previously, if this is necessary to minimize metering mistakes. The motors used for integration also effect the control of dosing, so that the aluminum sulfate solution can be dosed quantity and quality proportional. A temperature rise in the raw water facilitates and accelerates the floc formation and reduces the chemical consumption. Such temperature variations are ordinarily seasonal and allowance is made for them by adjusting the potentiometer 6 manually or by means of a control thermometer.

*Example 2.*—A paper manufacturing plant prepares a process water from a river water with a temperature of 10° C. in quantities varying from 350 to 600 m.$^3$/h. and with a carbonate hardness content between 10 and 20° dH (Deutche Härte). Due to its iron centent the water must be brought to a pH value of about 9.25 so that the iron hydroxide is precipitated. The water also contains small quantities of free corrosive carbon dioxide.

A decarbonization with hydrated lime is to be effected; the dosing is to be controlled from the carbonate hardness of the raw water and in order to bind the carbon dioxide, 20 g. lime/m.$^3$ raw water shall be fed additionally.

The dry feeder for lime is set for maximum dosing, i.e. 600 m.$^3$/h. and 20° carbonate hardness plus carbon dioxide addition (20 g. lime/m.$^3$), i.e. per m.$^3$ raw water the maximum dosage is about 300+20 g. hydrated lime, i.e. per minute (at 10 m.$^3$) 3.2 kg. hydrated lime with continuous operation. For this quantity the dosing device is set.

When the quantity of raw water is reduced for example to 350 m.$^3$/h., then the dosing device is actuated only for 35 seconds during a switching period of one minute, so that the dosage is automatically proportioned to the reduced quantity of water.

If additionally the carbonate hardness decreases to 10° dH, and therefore only about 150–20 g. hydrated lime are required, then the return potentiometer in the system according to FIGURE 2 must be positioned to $$\frac{150+20}{300+20} = \frac{170}{320} \cdot 100 = 53\%$$

of its maximum resistance value so that the effective return time is $$35 \text{ sec.} \cdot 53\% = 18.6 \text{ sec.}$$

During this time $$\frac{350 \text{ m.}^3/\text{h.}}{60 \text{ min./h.}} \cdot 170 \text{ g./m.}^3 = 990 \text{ g./min.}$$

or $$\frac{3200 \text{ g./min.} \cdot 18.6 \text{ sec./min.}}{60 \text{ sec./min.}} = 990 \text{ g./min.}$$

hydrated lime is fed.

In the decarbonation plant with a content corresponding to a detention time of e.g. one hour, a good mixing of the intermittently dosed quantities of lime is obtained, so that a uniform reaction is ensured.

We claim:

1. A system for controlling the quantity of a treating material to be fed to a fluid which varies in two characteristics to maintain a predetermined treating effect, comprising first and second means for measuring each of said characteristics, first and second reversible impulse counters, means including multiplying means connected to said measuring means and to said impulse counter to transmit during the first part of one cycle of operation measurements from said measuring means to the first impulse counter to advance the same, a reverse impulse transmitter connected to the second impulse counter during such part of the cycle to return the same to zero position, means to transmit during another part of the cycle measurements from said measuring means to the second impulse counter, said reverse impulse transmitter being connected to said first impulse counter during such other part of the cycle to return the same to zero position, feeding means, and means connected to the second impulse counter during such first part of the cycle and to the first impulse counter during such other part of the cycle to control said feeding means in dependence on the time required for such impulse counter to return to zero.

2. In a device as claimed in claim 1, said multiplying means comprising a watt meter.

3. A system for controlling the quantity of a treating material to be fed to a fluid which varies in two characteristics to maintain a predetermined treating effect, comprising first and second means for measuring each of said characteristics, first and second reversible impulse counters, means to transmit during the first part of one cycle of operation measurements from said measuring means to the first impulse counter to advance the same, a reverse impulse transmitter connected to the second impulse counter during such part of the cycle to return the same to zero position, means to transmit during another part of the cycle measurements from said measuring means to the second impulse counter, said reverse impulse transmitter being connected to said first impulse counter during such other part of the cycle to return the same to zero position, feeding means, and means connected to the second impulse counter during such first part of the cycle and to the first impulse counter during such other part of the cycle to control said feeding means in dependence on the time required for such impulse counter to return to zero, and non-proportional signal-modifying means connected with at least one of said measuring means.

4. A system for controlling the quantity of a treating material to be fed to a fluid which varies in two characteristics to maintain a predetermined treating effect, comprising first and second means for measuring each of said characteristics, first and second reversible impulse counters, means to transmit during the first part of one cycle of operation measurements from said measuring means to the first impulse counter to advance the same, a reverse impulse transmitter connected to the second impulse counter during such part of the cycle to return the same to zero position, means to transmit during another part of the cycle measurements from said measuring means to the second impulse counter, said reverse impulse transmitter being connected to said first impulse counter during such other part of the cycle to return the same to zero position, feeding means, and means connected to the second impulse counter during such first part of the cycle and to the first impulse counter during such other part of the cycle to control said feeding means in dependence on the time required for such impulse counter to return to zero, and means responsive to the measurements of one of said measuring means connected to said reverse impulse transmitter to vary the rate thereof.

References Cited in the file of this patent

UNITED STATES PATENTS

| 2,243,826 | Nielsen et al. | May 27, 1941 |
| 2,939,469 | Kampf et al. | June 7, 1960 |

FOREIGN PATENTS

| 688,642 | Great Britain | Mar. 11, 1953 |